(12) United States Patent
Kani et al.

(10) Patent No.: US 9,038,278 B2
(45) Date of Patent: May 26, 2015

(54) CUTTING TOOLS

(75) Inventors: Toshiyuki Kani, Anjo (JP); Goh Yamamura, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 439 days.

(21) Appl. No.: 13/152,700

(22) Filed: Jun. 3, 2011

(65) Prior Publication Data

US 2011/0296697 A1  Dec. 8, 2011

(30) Foreign Application Priority Data

Jun. 8, 2010  (JP) .................................. 2010-131148

(51) Int. Cl.
*B27B 19/04* (2006.01)
*B23D 51/10* (2006.01)

(52) U.S. Cl.
CPC ...................................... *B23D 51/10* (2013.01)

(58) Field of Classification Search
CPC .................................... B23D 1/08; B23D 1/10
USPC ........... 30/392–394, 329, 336, 337, 338, 339, 30/342; 408/226; 279/93, 104, 89
See application file for complete search history.

(56) References Cited

U.S. PATENT DOCUMENTS

| | | | | |
|---|---|---|---|---|
| 2,670,963 A * | 3/1954 | Osborn | ............................ | 279/53 |
| 4,299,402 A * | 11/1981 | Hoffman | ......................... | 279/75 |
| 5,165,173 A * | 11/1992 | Miller | ............................. | 30/392 |
| 5,306,025 A * | 4/1994 | Langhoff | ........................ | 279/90 |
| 5,661,909 A * | 9/1997 | Kondo et al. | .................... | 30/392 |
| RE36,269 E * | 8/1999 | Wright | ............................. | 279/90 |
| 5,946,810 A * | 9/1999 | Hoelderlin et al. | ............. | 30/392 |
| 5,988,034 A * | 11/1999 | Okubo et al. | .............. | 83/699.21 |
| 6,047,477 A * | 4/2000 | Di Nicolantonio | ............. | 30/392 |
| 6,308,425 B1* | 10/2001 | Schumann | ...................... | 30/392 |
| 6,735,876 B2* | 5/2004 | Hirabayashi | .................... | 30/392 |
| 7,047,651 B2* | 5/2006 | Delfini et al. | .................... | 30/394 |
| 7,861,418 B2* | 1/2011 | Kretschmar et al. | ............ | 30/392 |

(Continued)

FOREIGN PATENT DOCUMENTS

| | | |
|---|---|---|
| DE | 101 06 051 A1 | 8/2002 |
| EP | 0 930 121 A2 | 7/1999 |
| EP | 1 964 635 A2 | 9/2008 |

(Continued)

OTHER PUBLICATIONS

European Search Report issued in European Patent Application No. 11168925.3 dated Aug. 25, 2011.

(Continued)

*Primary Examiner* — Sean Michalski
*Assistant Examiner* — Jonathan G Riley
(74) *Attorney, Agent, or Firm* — Oliff PLC

(57) ABSTRACT

A blade mounting device of a cutting tool includes a lock device and a blade guide. The lock device is configured to releasably lock a blade against a rod of a cutting tool. The blade guide is movable relative to the rod in an axial direction of the rod and is coupled to the lock device, so that the lock device locks and releases the blade in response to position of the blade guide in the axial direction. The blade guide has a guide recess having a bottom and capable of guiding and engaging the blade, so that the blade guide can be moved by the blade in the axial direction through engagement of the guide recess with the blade. The blade guide has a configuration other than a thin flat plate configuration.

8 Claims, 13 Drawing Sheets

(56) References Cited

U.S. PATENT DOCUMENTS

2008/0209742 A1* 9/2008 Kretschmar et al. ............ 30/392
2010/0000100 A1* 1/2010 Saegesser ....................... 30/392

FOREIGN PATENT DOCUMENTS

| | | | |
|---|---|---|---|
| JP | 05278001 A | * 10/1993 | .............. B27B 19/02 |
| JP | 9-201801 A | 8/1997 | |
| JP | A-2002-346827 | 12/2002 | |
| JP | B2-4020974 | 12/2007 | |

OTHER PUBLICATIONS

Dec. 24, 2013 Office Action issued in Japanese Patent Application No. 2010-131148 (with translation).

* cited by examiner

US 9,038,278 B2

CUTTING TOOLS

This application claims priority to Japanese patent application serial number 2010-131148, the contents of which are incorporated herein by reference.

BACKGROUND OF THE INVENTION

1. Field of the Invention

The present invention relates to cutting tools, and in particular to cutting tools having mounting devices for mounting blades to rods of the cutting tools.

2. Description of the Related Art

Cutting tools are known that have blade mounting devices. For example, reciprocating cutting tools, such as jigsaws, have reciprocating rods and blade mounting devices for mounting blades to the rods. A known jigsaw has an electric motor as a drive source and the rotation of the electric motor is converted into a reciprocating movement of a rod by a motion conversion mechanism. A blade mounting device is provided on the rod for mounting a band-like blade. Various techniques have been proposed to enable the blade to be mounted and removed by a one-touch operation.

For example, U.S. Pat. No. 6,308,425 (also published as Japanese Patent No. 4020974) discloses a blade mounting device having an annular operating member, a blade holder and a blade guide. The operating member is operable to rotate between a blade mounting position and a blade removing position about an axis of a rod and is biased by a spring toward the blade mounting position. The blade holder is integrated with the inner circumference of the operating member and includes a cam portion engaging a blade insertion opening and lugs of the blade. The blade guide is received within the axial bore of the rod and axially movable between a non-restricting position on the back side of the axial bore and a restricting position on the inlet side of the axial bore. The blade guide is biased toward the restricting position. FIG. 18 shows a schematic view of this known blade mounting device (labeled with reference numeral 30) illustrating the relationship between the rod (labeled with reference numeral 31), the blade guide (labeled with reference numeral 32) and the blade (labeled with reference numeral 33). The illustration of the operating member and the blade holder is omitted in FIG. 18.

According to the blade mounting device 30, when a user inserts a head 33a of the blade 33 into the insertion hole of the blade holder to push the blade guide 32 upward toward the non-restricting position against the biasing force of the spring, the rotation restricting condition of the operating member at the blade removing position by legs 32a of the blade guide 32 is released, so that the operating member rotates toward the blade mounting position by the biasing force of the spring. Then, the cam portion of the blade holder restricts the movement of the blade 33 toward the removing direction, so that the blade 33 is held at the mounting position. On the contrary, when the user rotates the operating member toward the blade removing direction against the biasing force of the spring, the restriction by the cam portion of the blade holder is released, so that the blade 33 is pushed to move out of the insertion hole by the biasing force applied to the blade guide 32 toward the restricting position. When the blade 33 is removed and the blade guide 32 returns downward to the restricting position on the inlet side of the axial bore by the biasing force, the operating member is held at the blade removing position by the legs 32a of the blade guide 32.

In this way, according to the known blade mounting device 30, when the user inserts the head 33a of the blade 33 into the insertion hole, the operating member automatically rotates toward the blade mounting position to complete the mounting operation. On the contrary, when the user rotates the operating member toward the blade removing position, the blade 33 is pushed out of the insertion hole, so that the blade 33 can be easily removed.

The above known blade mounting device 30 still has the following problems. In the known blade mounting device 30, the blade guide 32 received within the axial bore of the rod 31 is made of a sheet metal that is formed by machining a thin steel plate and has a shape of flat plate. Opposite side portions in the widthwise direction of the blade guide 32 are inserted into guide recesses 31a formed on the opposite sides of the axial bore of the rod 31 so as to be movable in the axial direction between the non-restricting position on the back side of the axial bore and the restricting position on the inlet side of the axial bore. The head 33a having a flat angle shape is pressed into a V-shaped guide recess 32b formed in the blade guide 32 having the flat plate shape to center the blade 33 mainly with respect to its thickness direction.

Therefore, as shown in FIG. 18, the flat head 33a of the blade 33 intersects the flat blade guide 32 in a crisscross manner. As a result, practically, the position of the head 33a of the blade 33 relative to the guide recess 32b of the blade guide 32 is prone to change in a direction indicated by an outline arrow in FIG. 18 (i.e. the widthwise direction of the blade 33). Hence, the blade 33 may not be correctly centered, leading to unstable reciprocating movement of the blade 33.

Therefore, there is a need in the art for a cutting tool having a blade mounting device that can reliably position a blade.

SUMMARY OF THE INVENTION

According to the present teaching, a blade mounting device of a cutting tool includes a lock device and a blade guide. The lock device is configured to releasably lock a blade against a rod of a cutting tool. The blade guide is movable relative to the rod in an axial direction of the rod and is coupled to the lock device, so that the lock device locks and releases the blade in response to position of the blade guide in the axial direction. The blade guide has a guide recess having a bottom and capable of guiding and engaging the blade, so that the blade guide can be moved by the blade in the axial direction through engagement of the guide recess with the blade. The blade guide has a configuration other than a thin flat plate configuration. For example, the guide recess has a length in a direction perpendicular to the axial direction of the rod and a width in a direction perpendicular to the direction of the length and the axial direction of the rod, the bottom of the guide recess extending along the direction of the length. The length of the guide recess is longer than the width.

DETAILED DESCRIPTION OF THE INVENTION

Figure 1:
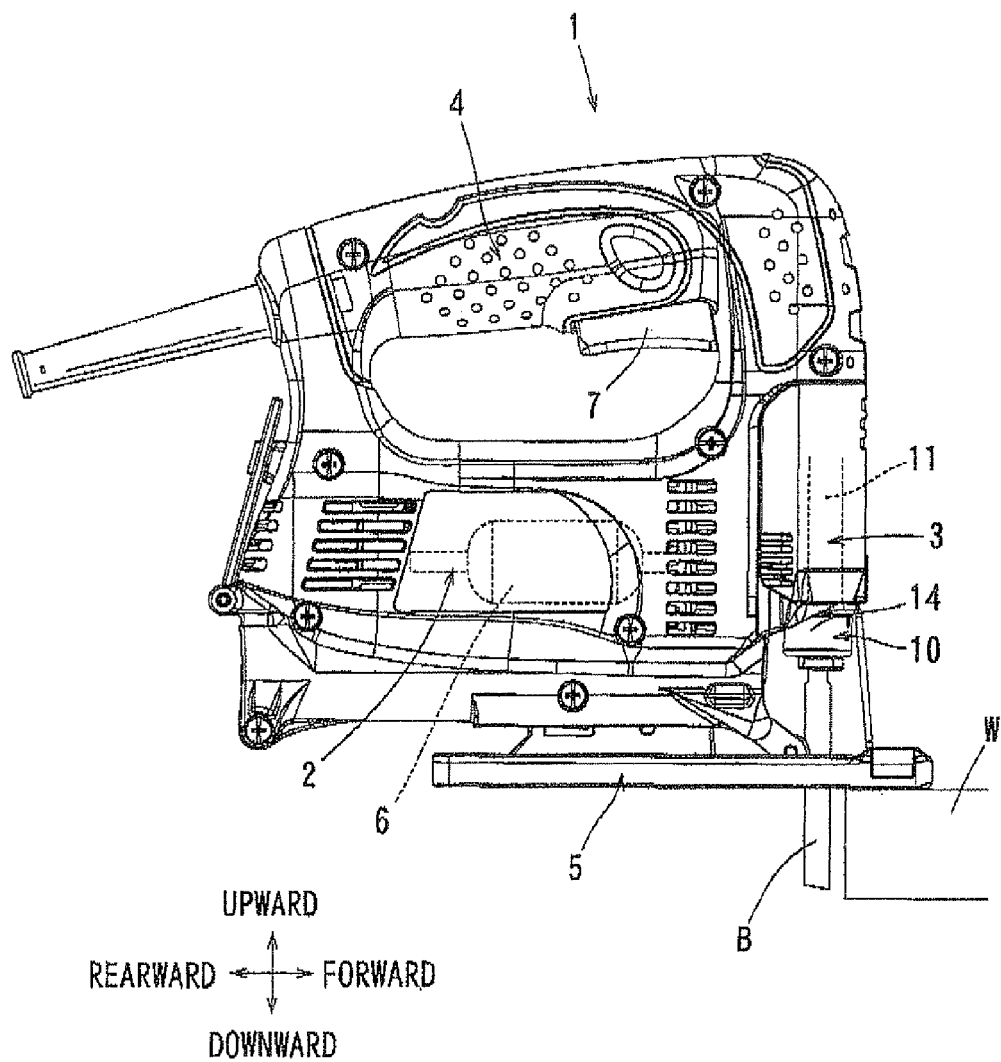
FIG. 1 is a side view of an entire jigsaw incorporating a blade mounting device according to a representative example.

Each of the additional features and teachings disclosed above and below may be utilized separately or in conjunction with other features and teachings to provide improved blade mounting devices and cutting tools incorporating such blade mounting devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one example, a blade mounting device for mounting a blade to a rod of a reciprocating cutting tool includes an operation member, a blade guide and a blade holder. The operation member is operable to rotate between a blade mounting position and a blade removing position about an axis of the rod and biased toward the blade mounting position by a first biasing device. The blade guide is movable between a restricting position and a non-restricting position in an axial direction. The blade guide is prevented from rotating about an axis and biased toward the non-restricting position by a second biasing device. The blade guide permits rotation of the operation member toward the blade mounting position as the blade guide moves toward the non-restricting position against a biasing force of the second biasing device. The blade guide holds the operation member at the blade removing position when the blade guide returns to the restricting position. The blade holder is disposed within the operation member and integrated therewith. The blade holder engages the engaging lugs of the blade to prevent movement of the blade in a removing direction when the operation member moves to the blade mounting position. The blade holder allows movement of the blade when the operation member is operated to rotate to the blade removing position. The blade guide has a substantially cylindrical configuration and includes a V-shaped guide recess formed along a diametrical direction of the blade guide for guiding a head of the blade.

According to this example, the blade guide has a cylindrical configuration unlike a thin plate shape of the known blade guide. Therefore, the guide recess for guiding the head of the blade may have a long length along a diametrical direction. In contrast, the guide recess of the known blade guide has a short length corresponding to the thickness of the blade guide. Because the guide recess of the blade guide serving as a centering device may have a long length, it is possible to reliably guide the head of the blade even in the case that the blade has been offset in the widthwise direction. Therefore, the function for centering the blade is improved and the blade can reciprocate more in stable.

The blade guide may includes at least one rotation preventing lug provided on a circumference of the blade guide for preventing rotation relative to an internal bore of the rod, and the at least one rotation preventing lug engages the operation member for holding the operation member at the blade removing position. With this arrangement, the rotation preventing lug serves to prevent the blade guide from rotation relative to the rod and also serves to hold the operation member at the blade removing position. Therefore, the construction of the blade mounting device can be simplified.

Cam portions may be provided on the blade holder for contacting the engaging lugs, respectively. The blade is held in a mounted position when the engaging lugs of the blade are resiliently clamped between the cam portions and the rod by a biasing force of the first biasing device. Therefore, the biasing force applied to the operation member can be efficiently utilized for holding the blade in the mounting position without causing the vertical displacement of the blade A representative example will now be described with reference to FIGS. 1 to 17. In this example, a jigsaw 1 is exemplified as an example of a reciprocating cutting tool. Referring to FIG. 1, there is shown an overall appearance of the jigsaw 1. The jigsaw 1 generally includes a tool body 2 having an electric motor 6 disposed therein, and a base 5 supported by the tool body 2 and extending along the lower portion of the tool body 2. An upper portion of the tool body 2 includes a loop-shaped handle 4. A motion converting mechanism 3 is disposed within a front portion of the tool body 2.

In order to operate the jigsaw 1, a user may be positioned on the left side of the jigsaw 1. The user then grasps the handle 4, carries the jigsaw 1 and positions the base 5 on an upper surface of a workpiece W. Thereafter, the user starts the motor 6 to reciprocate a blade B and moves the jigsaw 1 forwardly, so that the blade B cuts into the workpiece W. The cutting operation of the workpiece W can be performed in this way.

A switch lever 7 is mounted to the handle 4 at a position on a lower side of an upper portion of the handle 4. When the user pushes the switch lever 7 upward with fingers of his or her one hand grasping the handle 4, the electric motor 6 is started. Then, the rotation of the electric motor 6 is converted into a reciprocating movement of a rod 11 by the motion converting mechanism 3, so that the blade B reciprocates in the vertical direction together with the rod 11.

The basic construction of the jigsaw 1 described above may be the same as that of any of known jigsaws and will not be described in detail.

The blade B is mounted to the rod 11 by a blade mounting device 10. The blade mounting device 10 is of a tool-less type and can mount and remove the blade B by a simple operation known as a one-touch operation.

The blade mounting device 10 includes a blade guide 12, a blade holder 13 and an operation member 14. The upper portion of the rod 11 is supported by a slider (not shown) of the motion converting mechanism 3 via a support shaft (not shown) that is inserted into a support hole 11a, so that the rod 11 can pivot forwardly and rearwardly in the widthwise direction of the blade B relative to the slider. The rod 11 and eventually the blade mounting device 10 can be separated from the motion converting mechanism 3 by removing the support shaft from the support hole 11a. Therefore, the maintenance work of the blade mounting device 10 can be easily performed when necessary.

The details of the blade mounting device 10 are shown in FIGS. 2 to 17. The rod 11 has a square tubular configuration and opened at its lower end. As shown in FIGS. 5 and 12 to 14, an upper portion of a substantially cylindrical tubular guide support member 15 is inserted into the lower end of the rod 11 and is fixed in position relative to the rod 11. An upper portion of a guide engaging member 20 having a substantially cylindrical tubular configuration is inserted into to the lower end of the guide support member 15 and is fixed in position relative to the guide support member 15. Thus, the guide support member 15 and the guide engaging member 20 are fixedly mounted to the lower end of the rod 11 such that they cannot move relative to the rod 11 in an axial direction and cannot rotate relative to the rod 11 about its axis.

The internal bores of the guide support member 15 and the guide engaging member 20 have the same axis and the same diameter to jointly form a combined internal bore, in which the blade guide 12 is received so as to be axially movable between a non-restricting position on the back side (upper side as viewed in FIG. 2) of the combined internal bore and a restricting position on the inlet side (lower side as viewed in FIG. 2) of the combined internal bore. A compression spring 16 is interposed between the back side bottom of the internal bore of the guide support member 15 and the upper end of the blade guide 12, so that the blade guide 12 is biased downwardly toward the restricting position on the side of the inlet opening of the combined internal bore.

Figure 3:
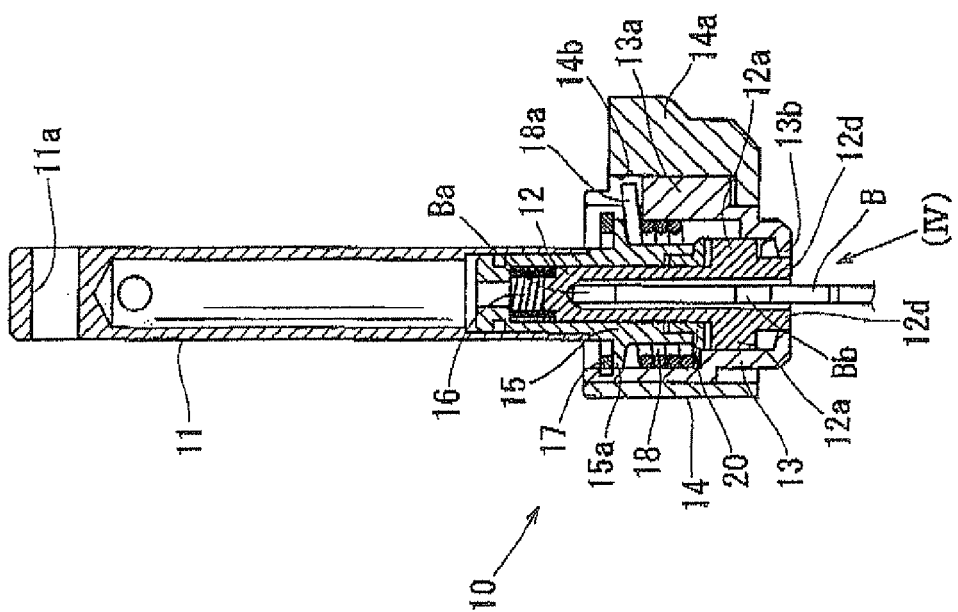
FIG. 3 is a vertical sectional view of the blade mounting device taken along a plane perpendicular to a plane of the vertical sectional view of FIG. 2.
Figure 9:
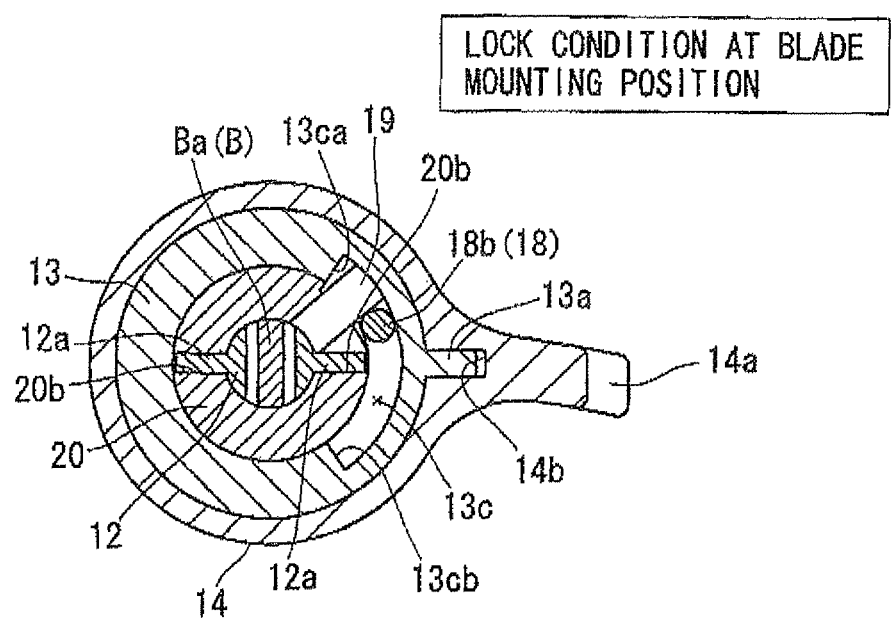
FIG. 9 is a horizontal sectional view of the blade mounting device taken along a plane across the center of an engaging pin (or taken along line IX-IX in FIG. 7) and showing the state where the blade is locked at a mounted position.
Figure 16:
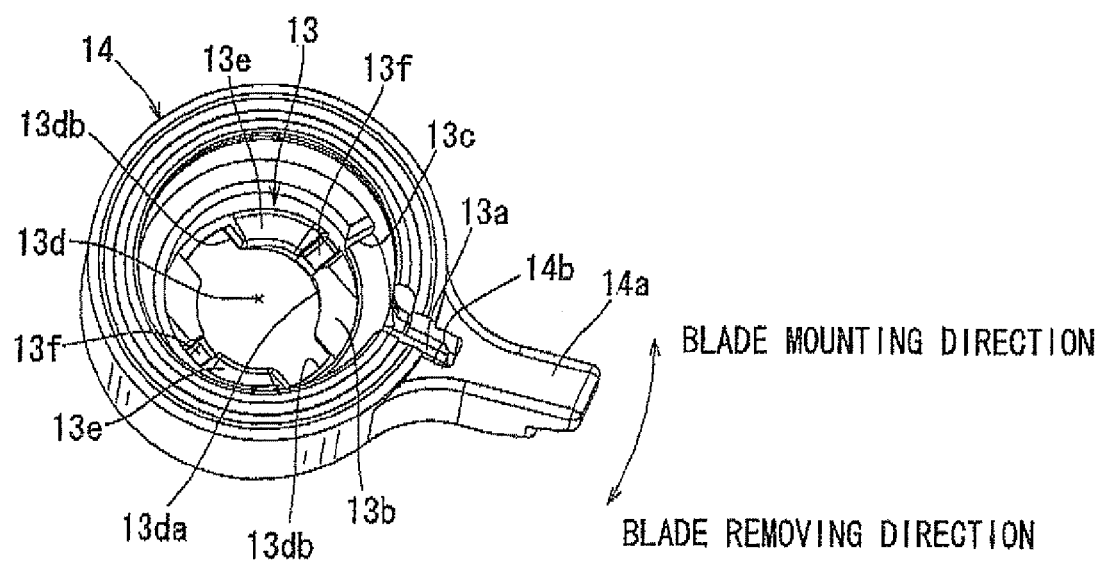
FIG. 16 is a perspective view of the operation and the blade holder integrated with each other of the blade mounting device and showing the inner circumferential side of the blade holder as viewed from a side obliquely upward thereof.

The blade holder 13 and the operation member 14 are assembled to each other with the guide support member 15 and the guide engaging member 20 positioned inside thereof. As shown in FIG. 16, each of the blade holder 13 and the operation member 14 has a substantially cylindrical tubular configuration and the blade holder 13 is positioned inside of the operation member 14. As shown in FIGS. 3, 9 and 16, an engaging lug 13a protruding laterally from the blade holder 13 is engaged with a corresponding engaging recess 14b formed in the inner circumference of the operation member 14 at a position radially inwardly of a knob portion 14a. The engaging recess 14b extends along the axial direction, so that the blade holder 13 is coupled to the operation member 14 not to rotate relative thereto.

Figure 2:
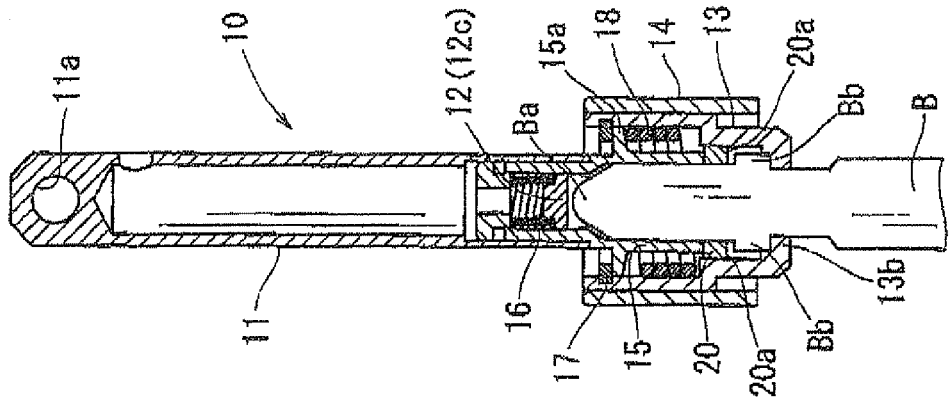
FIG. 2 is a vertical sectional view of the blade mounting device.
Figure 5:
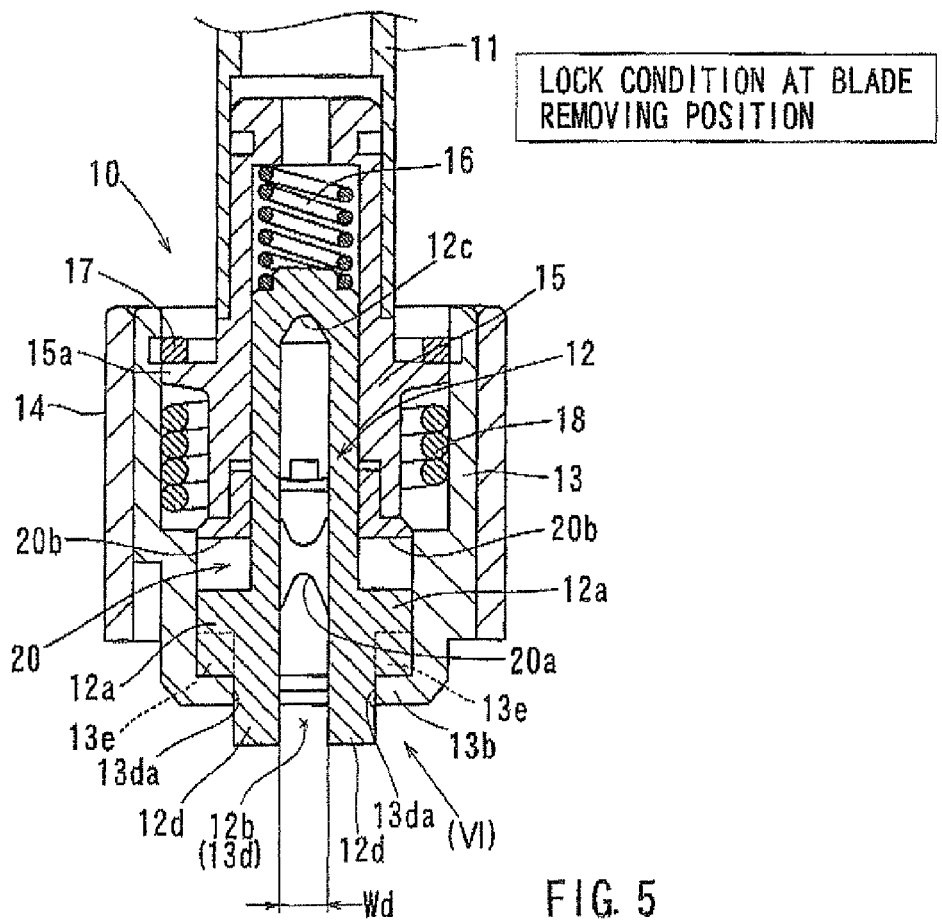
FIG. 5 is an enlarged vertical sectional view of the blade mounting device and showing the state where a blade has been removed.

As shown in FIGS. 2, 3 and 5, with the guide support member 15 and the guide engaging member 20 are received within the blade holder 13, a stop ring 17 is mounted within an upper portion of the blade holder 13 at a position on the upper side of a flange 15a formed on the guide support member 15. With this arrangement, the blade holder 13 and the operation member 14 are assembled such that they can rotate together about the axis but cannot move in the axial direction.

Figure 7:
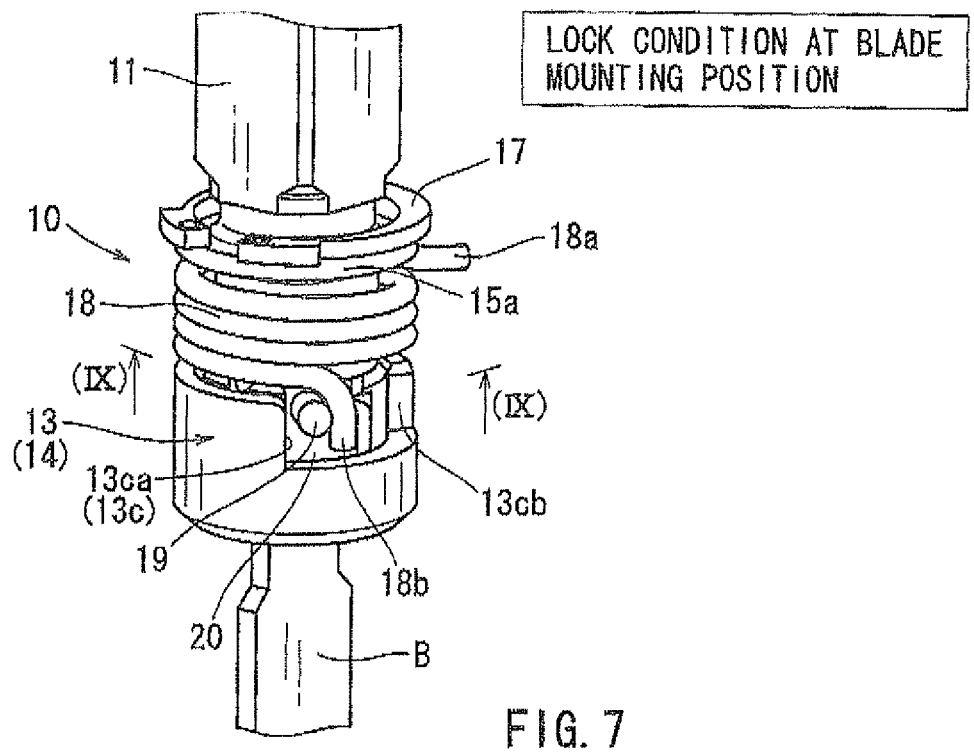
FIG. 7 is a perspective view of the blade mounting device with an operation member omitted, and showing the state where a blade holder has rotated to a blade mounting position, while an operation.
Figure 8:
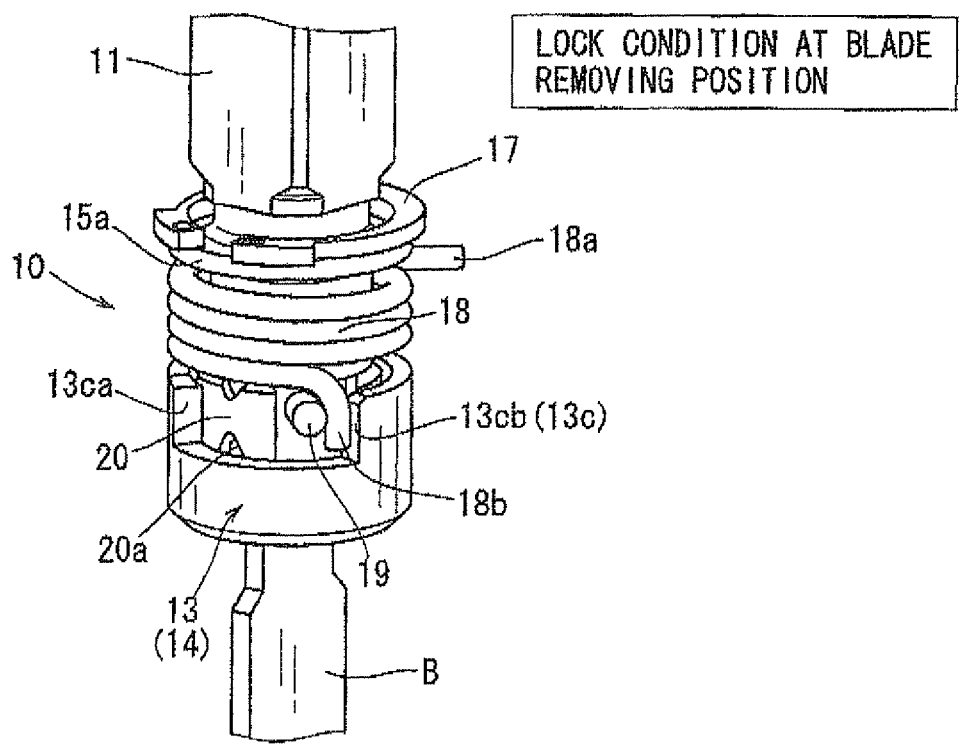
FIG. 8 is a perspective view similar to FIG. 7 but showing the state where the blade holder is held at a blade removing position.

A torsion spring 18 is fitted around the guide support member 15 at a position on the lower side of the flange 15a. An upper end 18a of the torsion spring 18 is engaged with the operation member 14 by being fitted into the engaging recess 14b. On the other hand, as shown in FIGS. 7 and 8, a lower end 18b of the torsion spring 18 is hooked to an engaging pin 19 that is mounted to the guide engaging member 20 so as to extend radially therefrom. Therefore, the torsion spring 18 is interposed between the guide engaging member 20 and the operation member 14, so that the operation member 14 is biased by the torsion spring 18 toward the blade mounting position (in a clockwise direction as viewed from the lower side, see FIG. 6) together with the blade holder 13.

The rotatable range of the operation member 14 and the blade holder 13 is limited to a movable range of the engaging pin 19 within a cut-out window 13c formed in the blade holder 13 as shown in FIGS. 7 and 8. As shown in FIG. 7, when the operation member 14 and the blade holder 13 rotate to reach the blade mounting position by the biasing force of the torsion spring 18, the engaging pin 19 abuts to an edge 13ca of the cut-out window 13c on the side of the blade removing position, so that the operation member 14 and the blade holder 13 are prevented from rotating further. On the other hand, when the operation member 14 and the blade holder 13 are rotated to reach the blade removing position, the engaging pin 19 (or the end portion 18b of the torsion spring 18) abuts to an edge 13cb of the cut-out window 13c on the side of the blade mounting position, so that the operation member 14 and the blade holder 13 are prevented from rotating further.

Figure 10:
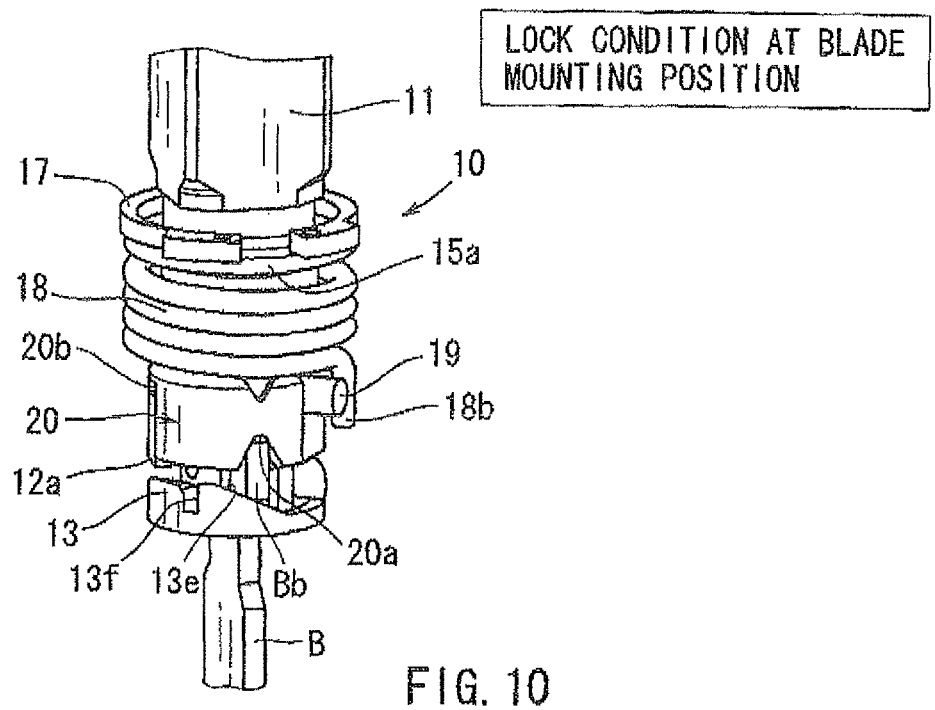
FIG. 10 is a perspective view of the blade mounting device showing the state where the blade holder has rotated to the blade mounting position similar to FIG. 7, while cam portions of the blade holder being shown in a separated position.
Figure 11:
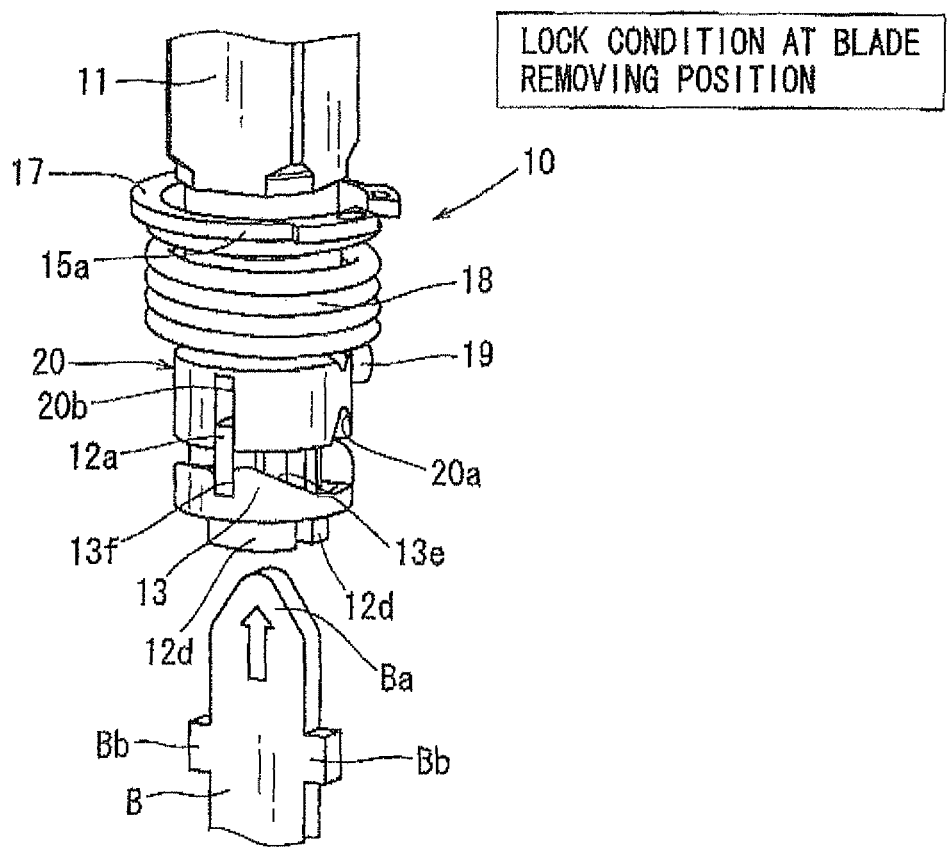
FIG. 11 is a perspective view of the blade mounting device showing the state where the blade holder is positioned at the blade removing position similar to FIG. 8, while the cam portions of the blade holder being shown in a separated position.
Figure 12:
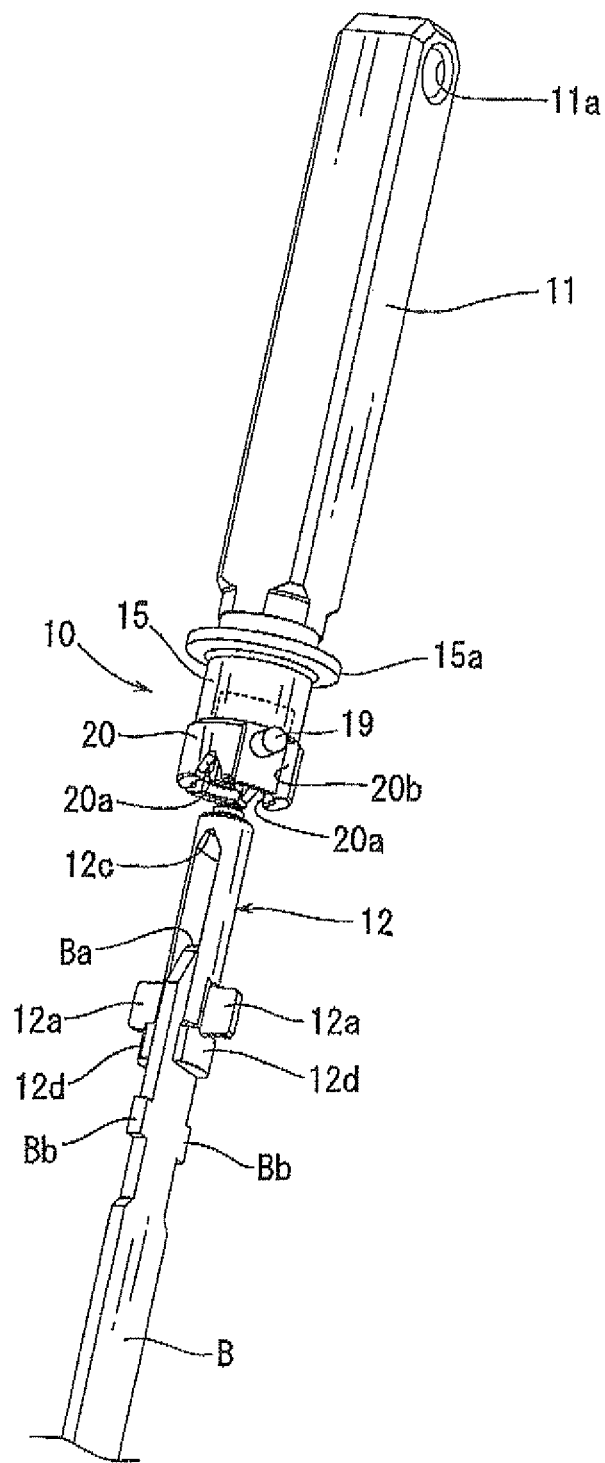
FIG. 12 is an exploded perspective view of the blade mounting device with the operation member and the blade holder omitted, and showing the state where the blade guide has been removed from inside of the rod.
Figure 13:
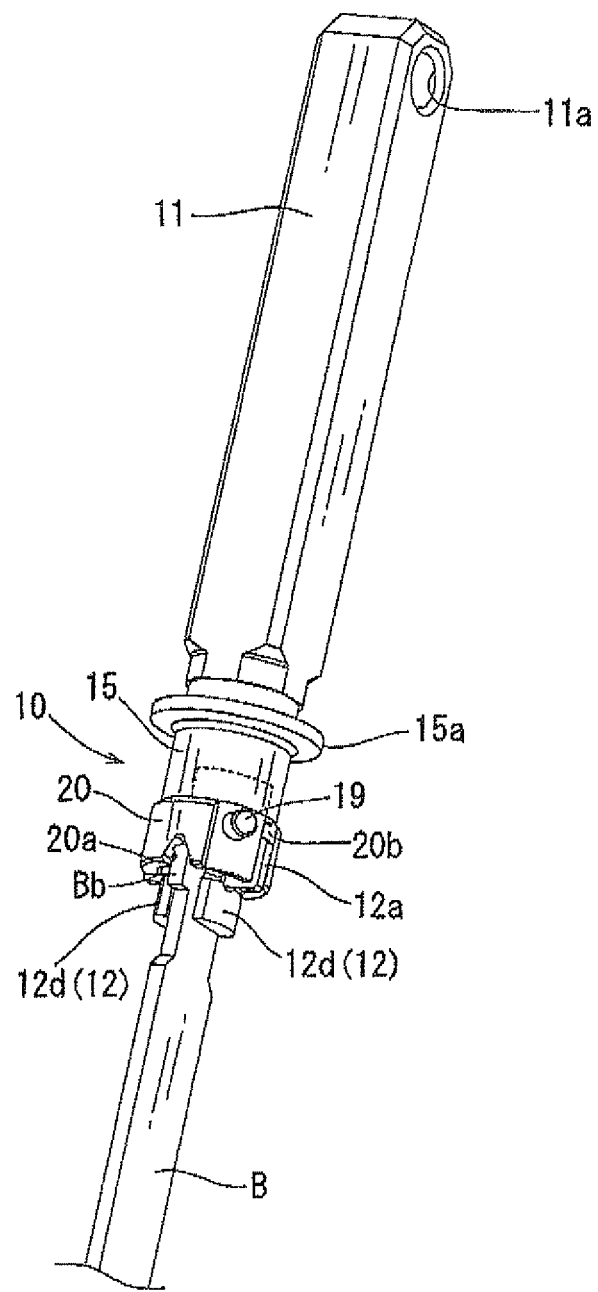
FIG. 13 is a perspective view of the blade and the rod and the blade guide of the blade mounting device and showing the state where the blade guide has been pushed into the back of the inside of the rod.
Figure 14:
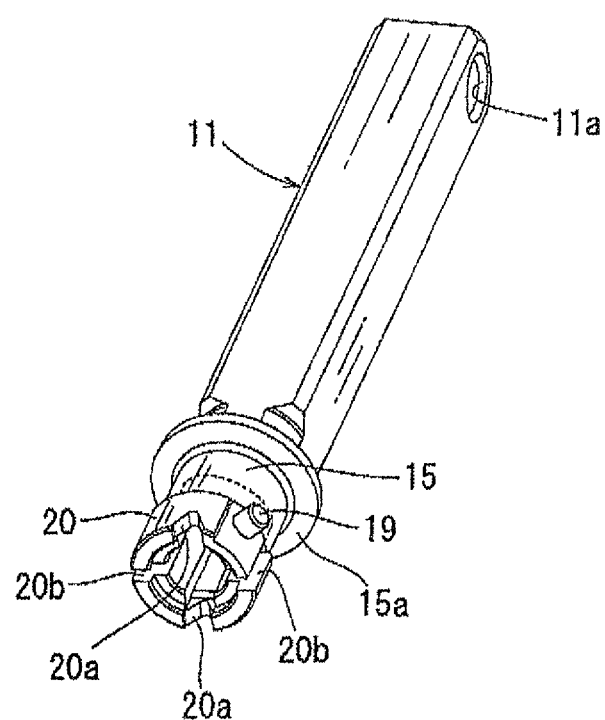
FIG. 14 is a perspective view of the rod of the blade mounting device as viewed from a side obliquely downwardly of the rod.

As shown in FIGS. 12 to 14, two V-shaped stopper recesses 20a and two vertically elongated engaging recesses 20b extending in the axial direction are formed at the lower end of the guide engaging member 20. The two V-shaped stopper recesses 20a are opposed to each other in the diametrical direction of the guide engaging member 20. Similarly, the two vertically elongated engaging recesses 20b are opposed to each other in the diametrical direction. As shown in FIG. 10, the upper movable limit of the blade B in the pushing direction is restricted due to engagement of engaging lugs Bb of the blade B with the respective stopper recesses 20a. Further, as shown in FIG. 11, rotation preventing lugs 12a of the blade guide 12 are inserted into the respective engaging recesses 20b, so that the blade guide 12 is prevented from rotating relative to the guide engaging member 20 and the guide support member 15, and eventually, relative to the rod 11.

Figure 15:
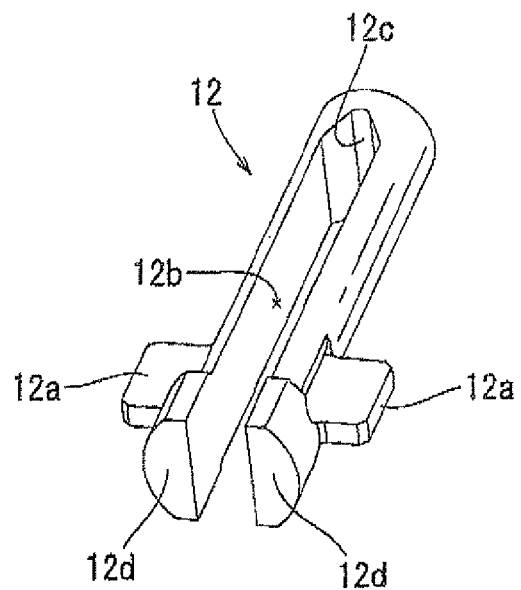
FIG. 15 is a perspective view of the blade guide of the blade mounting device as viewed from a side obliquely downwardly of the blade guide.
Figure 17:
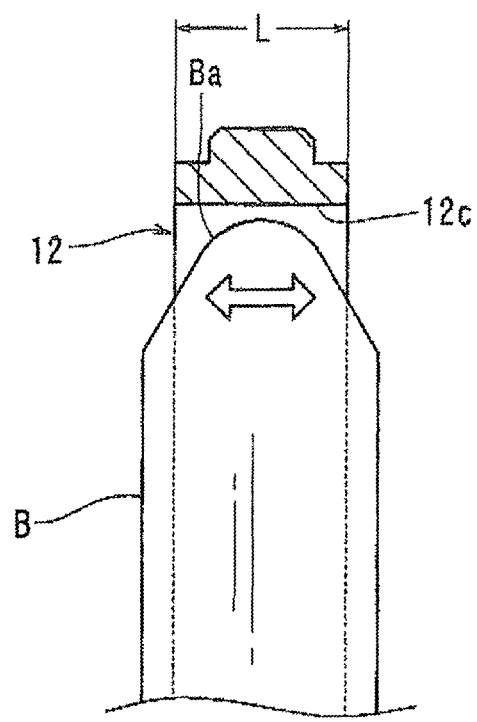
FIG. 17 is a vertical sectional view showing the positional relationship between a guide recess of the blade guide and a head of the blade.
Figure 18:
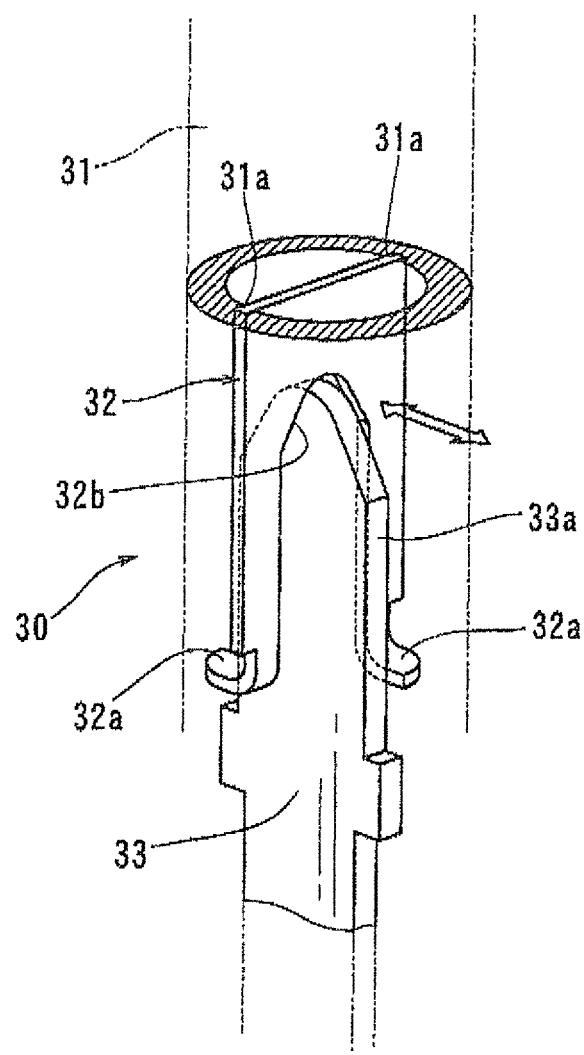
FIG. 18 is a perspective view of a known blade mounting device and schematically showing the relationship between a rod, a blade guide and a blade.

As shown in FIG. 15, the blade guide 12 has a substantially cylindrical configuration (or a pin-like configuration) unlike a flat plate-shape of a known blade guide. A blade insertion slot 12b is formed in the blade guide 12 and extends in the longitudinal direction of the blade guide 12 starting from its lower end. A V-shaped guide recess 12c having a bottom is formed at the bottom (upper portion) of the blade insertion slot 12b. The guide recess 120 has a length L (see FIG. 17) and a width Wd (see FIG. 5). The length L extends in a direction perpendicular to the axial direction of the blade guide 12 or the axial direction of the rod 11. The width Wd extends in a direction perpendicular to the length L and perpendicular to the axial direction of the blade guide 12 or the axial direction of the rod 11. As shown in FIG. 17, the bottom of the guide recess 12c extends along the length L. In this example, the width Wd of the guide recess 12c (including its bottom) is equal to the width Wd of the blade insertion slot 12b. The length L of the V-shaped guide recess 12c (including its bottom) in the diametrical direction of the blade guide 12 (i.e., perpendicular to the width) is substantially equal to the diameter of the blade guide 12. Because the blade guide 12 has a cylindrical configuration, the width Wd of the guide recess 12c or the width of the blade insertion slot 12b is naturally smaller than the diameter of the blade guide 12. Therefore, the length L of the guide recess 12c is longer than the width Wd of the same.

At the lower end of the blade guide 12, two holding portions 12d are provided. Each of the holding portions 12d has a semi-cylindrical configuration having a diameter larger than the remaining portion of the blade guide 12. The holding portions 12d define a lower end portion of the blade insertion slot 12b therebetween. As shown in FIG. 5, the holding portions 12d are inserted into a blade insertion opening 13d formed in the blade holder 13.

Figure 4:
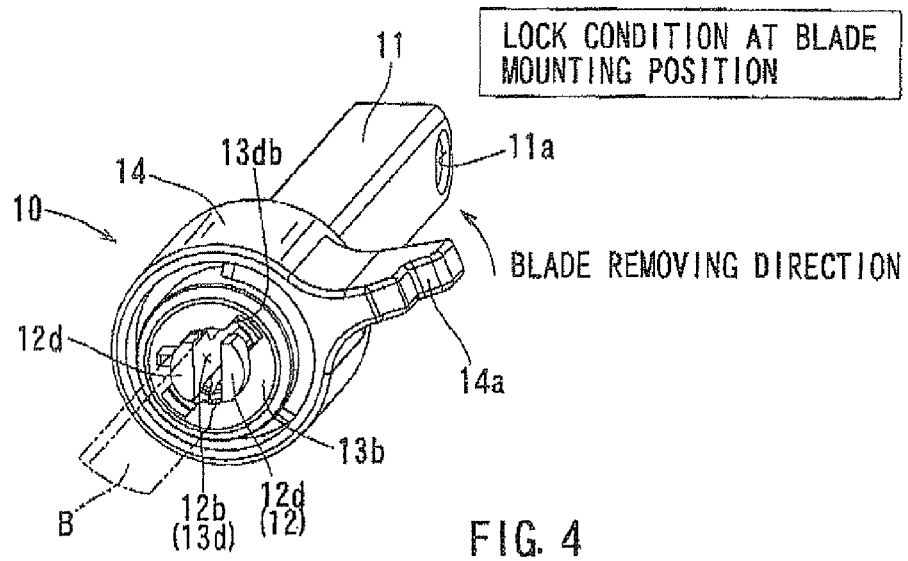
FIG. 4 is a perspective view of the blade mounting device as viewed from its lower side (in a direction indicated by arrow IV in FIG. 3)
Figure 6:
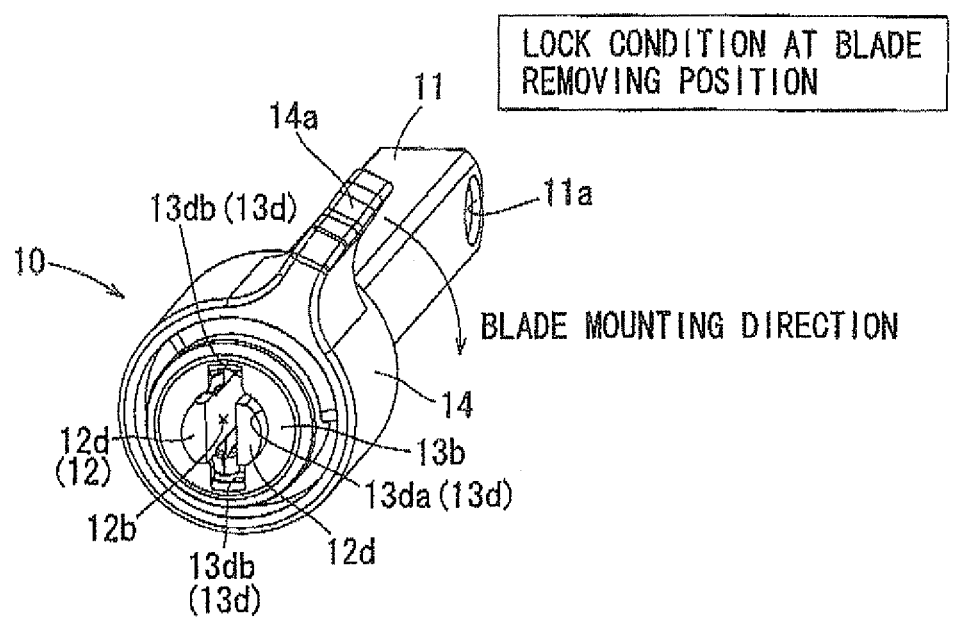
FIG. 6 is a perspective view of the blade mounting device as viewed from its lower side (in a direction indicated by arrow VI in FIG. 5)

As shown in FIGS. 4, 6 and 16, the blade insertion opening 13d is formed in a bottom portion 13b of the blade holder 13 and has a keyhole-like configuration. The blade insertion opening 13d includes a circular central hole portion 13da and a pair of radial hole portions 13db extending radially outwardly from opposite sides of the central hole portion 13da in a manner cut-into the circumferential edge of the central hole portion 13da. Each of the radial hole portions 13db has a rectangular configuration. The holding portions 12d of the blade guide 12 are inserted into the central hole portion 13da, so that the outer circumferential edges of the holding portions 12d slidably contact portions of the peripheral edge of the central hole portion 13da opposed to each other without any clearances. Therefore, the central hole portion 13da is closed by the holding portions 12d without substantial clearance except for the blade insertion slot 12b.

As shown in FIG. 6, when the operation member 14 is locked at the blade removing position (hereinafter called a look condition at the blade removing position), the rectangular hole portions 13db are brought to be positioned in series with the upper and lower sides of the blade insertion slot 12b. In the state that the rectangular hole portions 13db are positioned in series with the blade insertion slot 12b in this way, the blade B can be inserted into and removed from the blade insertion opening 13d.

As a head Ba of the blade B is inserted and pushed into the blade insertion opening 13d, the leading end of the head Ba abuts to the bottom of the guide recess 12c of the blade guide 12, so that the blade guide 12 moves together with the blade B to the non-restricting position at the back of the internal bore of the blade guide 12. When the blade guide 12 reaches the non-restricting position, the rotation preventing lugs 12a of the blade guide 12 are withdrawn from engaging recesses 13f of the blade holder 13, which will be explained later. Therefore, the operation member 14 automatically rotates toward the blade mounting position by the biasing force of the torsion spring 18, so that the mounting operation of the blade B is completed. The lock condition of the operation member 14 at the blade mounting position is shown in FIG. 4 and will be hereinafter called a lock condition at the blade mounting position.

On the upper surface of the bottom portion 13b around the blade insertion opening 13d of the blade holder 13, two cam portions 13e are formed at positions opposed to each other in the diametrical direction. The cam portions 13e are inclined such that their height gradually becomes higher (toward the pushing direction of the blade B) in a clockwise direction as viewed from the upper side.

As the blade B is inserted into the blade insertion opening 13d and further into the blade insertion slot 12b so as to be pressed against the bottom of the guide recess 120, the operation member 14 and the blade holder 13 rotate toward the blade mounting position by the biasing force of the torsion spring 18 as described above. Then, the engaging lugs Bb of the blade B move to slide along the cam portions 13e, respectively. Therefore, the biasing force of the torsion spring 18 acts to force the blade B toward the pushing direction. Hence, the engaging lugs Bb of the blade B move to engage the stopper recesses 20a of the guide engaging members 20, and as a result, the engaging lugs Bb are resiliently held between the cam portions 13e and the bottoms of the stopper recesses 20a and are prevented from moving in the vertical direction. This state corresponds to the lock condition at the blade mounting position.

The engaging recesses 13f of the blade holder 13 are formed in the upper surface of the outer circumference of the blade holder 13 at positions upwardly away from the bottom portion 13b and around the blade insertion opening 13d. More specifically, the engaging recesses 13f are positioned to oppose to each other in the diametrical direction of the blade holder 13 and to be proximate to the end portions of the cam portions 13e, which are positioned higher than the end portions on the opposite side. As shown in FIG. 10, as the blade B is inserted to move the blade guide 12 toward the back of the internal bore of the guide support member 15, the rotation preventing lugs 12a are removed upwardly from the engaging recesses 13f. When this occurs, the lock condition at the blade removing position of the operation member 14 and the blade holder 13 is released, so that the operation member 14 and the blade holder 13 rotate toward the blade mounting position by the biasing force of the torsion spring 18.

On the other hand, when the operation member 14 and the blade holder 13 are rotated from the blade mounting position to the blade removing position against the biasing force of the torsion spring 18 as shown in FIGS. 8 and 11, the engaging recesses 13f move to positions on the lower side of the engaging recesses 20b of the guide engaging member 20, respectively. Therefore, the rotating preventing edges 12a of the blade guide 12 are allowed to enter the corresponding engaging recesses 13f. As a result, the blade guide 12 is moved to return to the restricting position in a blade ejecting direction (downward direction) by the biasing force of the compression spring 16. As the blade guide 12 returns downward to the restricting position, its rotation preventing lugs 12a are brought to engage the engaging recesses 13f of the blade holder 13, so that the operation member 14 is locked at the blade removing position (the lock condition at the blade removing position) as shown in FIG. 6.

In this way, the operation member 14 and the blade holder 13 integrated therewith serve as a lock device for releasably locking the blade B against the rod 11. The blade guide 12 is coupled to the lock device, so that the lock device locks and releases the blade B when the blade guide 12 is in the restricting position and the non-restricting position, respectively.

As described previously, when the operation member 14 is locked at the blade removing position, the rectangular hole portions 13db of the blade insertion opening 13d are positioned in series with and in line with the blade insertion slot 12b of the blade guide 12. Therefore, if the user wishes to again mount the blade B after removal, it is only necessary to insert the head Ba of the blade B into the blade insertion opening 13d without need of any other operation. Therefore, the blade mounting device 10 is improved in the operability.

According to the blade mounting device 10 of this representative example, the blade guide 12 axially movably received with the internal bore of the rod 11 and forced to move to the back of the internal bore of the rod 11 by the pushing operation of the blade B has a cylindrical configuration unlike a flat plate shape of the blade guide of the known blade mounting device. Therefore, the guide recess 12c for guiding the head Ba of the blade B has a long length in the diametrical direction. Thus, as shown in FIG. 17, the head Ba of the blade B can be guided by the guide recess 12c along a long distance in the widthwise direction of the blade B (the left and right direction as viewed in FIG. 17), and therefore, the guide recess 12c can reliably center and position the blade B in stable with respect to the pushing direction (axial direction of the rod 11).

Because the head Ba of the blade B is guided in stable by the blade guide 12, the path of the reciprocating movement or the orbital movement of the blade B can be stabilized. The cutting ability of the jigsaw 1 can be improved in this respect.

Because the blade guide 12 for holding the head Ba of the blade B has a cylindrical configuration, the blade insertion slot 12b has a large width in the widthwise direction of the blade B. Therefore, in comparison with the known blade guide having a flat plate shape, it is possible to restrict the torsional deformation or displacement in the torsional direction of the blade B over a range broader in the widthwise direction. Therefore, the path of the reciprocating movement of the blade B can be further stabilized to enable more stable cutting operation.

Further, according to the representative example, opposite sides of the circular central hole portion 13da of the keyhole-like blade insertion opening 13d are closed by the holding portions 12d of the blade guide 12. Therefore, it is possible to prevent foreign particles, such as powder dust, from entering inside of the blade mounting device 10.

Furthermore, according to the representative example, the assembling operation of the blade mounting device 10 is performed by mounting the guide support member 15 to the leading end of the rod 11, mounting the guide engaging member 20 to the leading end of the guide support member 15, mounting the compression spring 16 and the blade holder 12 within the combined internal bore of the guide support member 15 and the guide engaging member 20, setting the torsion spring 18, the blade holder 13 and the operation member 14 to the subassembly having the guide support member 15 and the guide engaging member 20 and prepared by the previous step, and finally attaching the stop ring 17. Therefore, the blade mounting device 10 can be assembled by mounting, setting or attaching their components (other than the rod 11) to the leading end of the rod 11 from the same direction from the lower side of the rod 11). As a result, it is possible to efficiently perform the assembling operation of the blade mounting device 10.

Because the components of the blade mounting device 10 can be disassembled by removing the stop ring 17, the maintenance work, such as a replacement work of any of the components of the blade mounting device 10 can be easily performed. In contrast, a component of the known blade mounting device 30 corresponding to the blade holder 13 is mounted to the rod by crimping and is difficult to be disassembled after being mounted. Therefore, the maintenance work of the known blade mounting device 30 cannot be efficiently performed.

The upper end 18a of the torsion spring 18 biasing the operation member 14 in the blade mounting direction is engaged with the engaging recess 14b of the operation member 14, while the lower end 18b is hooked to the engaging pin 19 of the guide engaging member 20. Therefore, the assembling operation of the torsion spring 18 can be easily rapidly performed. The blade mounting device 10 is improved also in this respect.

Furthermore, the blade mounting device 10 can be assembled to the motion conversion mechanism 3 by inserting the support shaft into the support hole 11a of the rod 11. Therefore, the blade mounting device 10 can be removed from the motion conversion mechanism 3 or the side of the tool body 2 by withdrawing the support shaft from the support hole 11a. Hence, it is possible to facilitate the maintenance work in this respect. In the conventional construction, the upper end of the rod is non-removably joined to the motion conversion mechanism, for example, by laser-welding, and therefore, the assembling operation and the maintenance work of the blade mounting device cannot be efficiently performed.

In addition, the operation member 14 and the blade holder 13 can be removed by removing the stop ring 17, and therefore, the blade guide 12 can be easily removed from within the internal bores of the blade support member 15 and the blade engaging member 20. Hence, the blade mounting device 10 can be easily disassembled to enable the maintenance work to be further efficiently performed.

Because the operation member 14 of the blade mounting device 10 is locked at the blade mounting position due to insertion of the rotation preventing lugs 12a into the engaging recesses 13f formed in the upper surface of the blade holder 13 away from the bottom portion 13b, it is not necessary to provide openings in the bottom portion 13b for receiving the legs 32a as required in the known blade mounting device 30. Therefore, as shown in FIG. 4, in the state that the operation member 14 is locked at the blade mounting position, there is no opening exposed to the lower side of the blade mounting device 10 other than the radial hole portions 13da of the blade insertion opening 13d. As a result, it is possible to improve the dust preventing ability of the blade mounting device 10.

The above representative example can be modified in various ways. For example, although the jigsaw 1 was described as an example of a reciprocating cutting tool, the blade mounting device 10 can be applied to any other reciprocating cutting tools and also to cutting tools having no mechanism for reciprocating a blade.

Further, although the blade guide 12 has a substantially cylindrical configuration in the above example, the blade guide 12 may have any other configuration, such as a polygonal column, other than a thin flat plate configuration.

What is claimed is:

1. A cutting tool comprising:
a rod reciprocating in an axial direction of the rod; and
a blade mounting device configured to mount a blade to the rod, the blade being configured to have a shape of a band plate having a width, and the blade including a head and engaging lugs on opposite sides in a direction of the width, the blade mounting device comprising:
an operation member operable to rotate between a blade mounting position and a blade removing position about an axis of the rod and biased toward the blade mounting position by a first biasing device;
a blade holder disposed within the operation member and integrated therewith, and
a blade guide movable relative to the rod between a restricting position and a non-restricting position in an axial direction of the rod, the blade guide being prevented from rotating about an axis and biased toward the restricting position by a second biasing device, wherein:
the blade guide permits rotation of the operation member toward the blade mounting position as the blade guide moves toward the non-restricting position against a biasing force of the second biasing device, and the blade guide holds the operation member at the blade removing position when the blade guide returns to the restricting position;
the blade holder engages the engaging lugs of the blade to prevent movement of the blade in a removing direction when the operation member moves to the blade mounting position, and the blade holder allows movement of the blade when the operation member is operated to rotate to the blade removing position;
the blade guide includes a V-shaped guide recess that extends transverse to a longitudinal axis of the blade guide, and has a substantially cylindrical configuration;
the blade guide further includes a blade insertion slot extending along the longitudinal axis of the blade guide, the blade insertion slot having a first end and a second end opposite to the first end, the first end being an open end, and the second end facing to the V-shaped guide recess;
the blade insertion slot has a length in a direction along the longitudinal axis and has a width in a diametrical direction of the blade guide, the length of the blade insertion slot being greater than a length of the V-shaped guide recess in the direction along the longitudinal axis, and the width of the blade insertion slot being substantially uniform along the length thereof,
the blade guide includes a pair of rotation preventing lugs provided at positions opposite to each other in a widthwise direction of the blade insertion slot, the pair of rotation preventing lugs being provided on a circumference of the blade guide for preventing rotation relative to an internal bore of the rod, and the pair of rotation preventing lugs engaging the operation member for holding the operation member at the blade removing position;
the first end of the blade insertion slot is defined between a pair of holding portions opposed to each other in the widthwise direction of the blade insertion slot;
the blade holder has a blade insertion opening configured to receive the blade guide, a first engaging recess and a cam surface are formed on the blade holder;
the pair of rotation preventing lugs are positioned between the pair of holding portions and the V-shaped guide recess with respect to the axial direction;
as the operation member moves from the blade mounting position toward the blade removing position, the blade guide moves toward the restricting position by the biasing force of the second biasing device, so that the at least one rotation preventing lug removably engages the first engaging recess to inhibit movement of the operation member toward the blade mounting position;
as the operation member moves from the blade removing position toward the blade mounting position after the blade is inserted into the blade guide, the cam surface contacts the engaging lug of the blade so as to resiliently hold the engaging lug between the cam surface and the rod by the biasing force of the first biasing device, so that the blade is held at a mounting position, and
a second engaging recess is formed in the rod at a position opposing the cam surface and engages the engaging lug of the blade to prevent rotation of the blade about an axis when the blade is positioned at the mounting position.

2. A cutting tool comprising:
a rod;
a blade having a head and a width, the blade having an engaging lug; and
a blade mounting device including a lock device and a blade guide, wherein:
the lock device is configured to releasably lock the blade against the rod, the lock device including an operation member operable to rotate between a blade mounting position and a blade removing position about an axis of the rod and biased toward the blade mounting position by a first biasing device;
the blade guide is movable between a restricting position and a non-restricting position relative to the rod in an axial direction of the rod and coupled to the lock device, so that the lock device locks and releases the blade in response to a position of the blade guide in the axial direction, the blade guide being biased toward the restricting position by a second biasing device;
the blade guide has a V-shaped guide recess that extends transverse to a longitudinal axis of the blade guide, and is capable of engaging the blade, so that the blade guide can be moved by the blade in the axial direction through engagement of the V-shaped guide recess with the blade;
the V-shaped guide recess has a length in a direction perpendicular to the axial direction of the rod and a width in a direction perpendicular to the direction of the length and the axial direction of the rod, the bottom of the V-shaped guide recess extending along the direction of the length;
the length of the V-shaped guide recess is longer than the width;
the blade guide further includes a blade insertion slot extending along the axial direction, the blade insertion slot having a first end and a second end opposite to the first end, the first end being an open end, and the second end facing to the V-shaped guide recess; and
the blade insertion slot has an axial length in the axial direction and has a width in the direction perpendicular to the axial length, the axial length of the blade insertion slot being greater than a depth in the axial direction of the V-shaped guide recess, and the width of the blade insertion slot being substantially uniform along the axial length thereof,
the blade guide includes a pair of rotation preventing lugs provided on a circumference of the blade guide at positions opposite to each other in a widthwise direction of the blade insertion slot for preventing rotation relative to an internal bore of the rod, the pair of rotation preventing lugs engaging the operation member for holding the operation member at the blade removing position;

the first end of the blade insertion slot is defined between a pair of holding portions each having a semi-cylindrical configuration and opposed to each other in the widthwise direction of the blade insertion slot;

the pair of rotation preventing lugs are positioned proximal to the pair of holding portions in the axial direction, and the pair of rotation preventing lugs are positioned between the pair of holding portions and the V-shaped guide recess with respect to the axial direction;

a first engaging recess and a cam surface are formed on the lock device;

as the operation member moves from the blade mounting position toward the blade removing position, the blade guide moves toward the restricting position by the biasing force of the second biasing device, so that the at least one rotation preventing lug removably engages the first engaging recess to inhibit movement of the operation member toward the blade mounting position;

as the operation member moves from the blade removing position toward the blade mounting position after the blade is inserted into the blade guide, the cam surface contacts the engaging lug of the blade so as to resiliently hold the engaging lug between the cam surface and the rod by the biasing force of the first biasing device, so that the blade is held at a mounting position, and a second engaging recess is formed in the rod at a position opposing the cam surface and engages the engaging lug of the blade to prevent rotation of the blade about an axis when the blade is positioned at the mounting position.

3. The cutting tool as in claim 2, wherein the blade guide has a substantially cylindrical configuration having the longitudinal axis extending along the axis of the rod.

4. The cutting tool as in claim 2, wherein:

the rod reciprocally moves in the axial direction;

the blade has a shape of a band plate and has two engaging lugs on opposite sides in the direction of the width, the lock device of the blade mounting device includes a blade holder disposed within the operation member and integrated therewith, the pair of holding portions being received by a central hole portion of the blade holder, wherein:

the blade guide is prevented from rotating about an axis and movable between the restricting position and the non-restricting position in the axial direction of the rod;

the blade guide permits rotation of the operation member toward the blade mounting position as the blade guide moves toward the non-restricting position against the biasing force of the second biasing device, and the blade guide holds the operation member at the blade removing position when the blade guide returns to the restricting position; and the blade holder engages the engaging lugs of the blade to prevent movement of the blade in a removing direction when the operation member moves to the blade mounting position, and the blade holder allows movement of the blade when the operation member is operated to rotate to the blade removing position.

5. The cutting tool as in claim 4, wherein the cam surface is provided on the blade holder, so that the blade is held in a mounted position when the two engaging lugs are resiliently clamped between the cam surface and the rod by the biasing force of the first biasing device.

6. The cutting tool as in claim 4, wherein the blade holder has a blade insertion opening including the central hole portion and a pair of radial hole portions formed in series with the central hole portion on opposite sides thereof for receiving the blade, and the central hole portion is configured to receive one end of the blade guide without substantially forming a clearance between the one end of the blade guide and the blade holder.

7. The cutting tool as in claim 6, wherein the one end of the blade guide has an outer circumference extending along a circle, and the central hole portion of the blade holder is configured to have a circular configuration.

8. A cutting tool comprising:

a rod reciprocating in an axial direction of the rod; and a blade mounting device configured to mount a blade to the rod, the blade being configured to have a shape of a band plate having a width, and the blade including a head and engaging lugs on opposite sides in a direction of the width, the blade mounting device comprising:

an operation member operable to rotate between a blade mounting position and a blade removing position about an axis of the rod and biased toward the blade mounting position by a first biasing device;

a blade holder disposed within the operation member and integrated therewith, and a blade guide movable relative to the rod between a restricting position and a non-restricting position in an axial direction of the rod, the blade guide being prevented from rotating about an axis and biased toward the restricting position by a second biasing device, wherein:

the blade guide permits rotation of the operation member toward the blade mounting position as the blade guide moves toward the non-restricting position against a biasing force of the second biasing device, and the blade guide holds the operation member at the blade removing position when the blade guide returns to the restricting position;

the blade holder engages the engaging lugs of the blade to prevent movement of the blade in a removing direction when the operation member moves to the blade mounting position, and the blade holder allows movement of the blade when the operation member is operated to rotate to the blade removing position;

the blade guide includes a V-shaped guide recess that extends transverse to a longitudinal axis of the blade guide, and has a substantially cylindrical configuration;

the blade guide further includes a blade insertion slot extending along the longitudinal axis of the blade guide, the blade insertion slot having a first end and a second end opposite to the first end, the first end being an open end, and the second end facing to the V-shaped guide recess;

the blade guide includes a pair of rotation preventing lugs provided at positions opposite to each other in a widthwise direction of the blade insertion slot, the pair of rotation preventing lugs being provided on a circumference of the blade guide for preventing rotation relative to an internal bore of the rod, and the pair of rotation preventing lugs engaging the operation member for holding the operation member at the blade removing position;

a first engaging recess and a cam surface are formed on the blade holder;

as the operation member moves from the blade mounting position toward the blade removing position, the blade guide moves toward the restricting position by the biasing force of the second biasing device, so that the at least one rotation preventing lug removably engages the first engaging recess to inhibit movement of the operation member toward the blade mounting position;

as the operation member moves from the blade removing position toward the blade mounting position after the blade is inserted into the blade guide, the cam surface contacts the engaging lug of the blade so as to resiliently hold the engaging lug between the cam surface and the rod by the biasing force of the first biasing device, so that the blade is held at a mounting position, and a second engaging recess is formed in the rod at a position opposing the cam surface and engages the engaging lug of the blade to prevent rotation of the blade about an axis when the blade is positioned at the mounting position.

* * * * *